US011914943B1

(12) United States Patent
Zhong et al.

(10) Patent No.: US 11,914,943 B1
(45) Date of Patent: Feb. 27, 2024

(54) GENERATING AN ELECTRONIC DOCUMENT WITH A CONSISTENT TEXT ORDERING

(71) Applicant: Oracle International Corporation, Redwood Shores, CA (US)

(72) Inventors: Xu Zhong, Vermont South (AU); Vishank Bhatia, Sunnyvale, CA (US); Thanh Long Duong, Point Cook (AU); Mark Johnson, Castle Cove (AU); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/169,740

(22) Filed: Feb. 15, 2023

Related U.S. Application Data

(60) Provisional application No. 63/400,008, filed on Aug. 22, 2022.

(51) Int. Cl.
*G06F 17/00* (2019.01)
*G06F 40/103* (2020.01)
(Continued)

(52) U.S. Cl.
CPC .......... *G06F 40/103* (2020.01); *G06F 40/205* (2020.01); *G06F 40/284* (2020.01); *G06F 40/30* (2020.01)

(58) Field of Classification Search
CPC .... G06F 40/103; G06F 40/205; G06F 40/284; G06F 40/30
See application file for complete search history.

(56) References Cited

U.S. PATENT DOCUMENTS

| 8,150,160 B2 * | 4/2012 | Al-Muhtaseb | G06F 18/295 |
| | | | 382/190 |
| 8,384,917 B2 * | 2/2013 | Tzadok | G06T 11/60 |
| | | | 358/1.9 |

(Continued)

OTHER PUBLICATIONS

"Add RTL and bidirectional text to PDF with Docotic.Pdf 8.5", Retrieved from https://bitmiracle.com/blog/rtl-bidi-text-to-pdf, Mar. 3, 2022, 2 Pages.

(Continued)

*Primary Examiner* — Laurie A Ries
(74) *Attorney, Agent, or Firm* — Invoke

(57) ABSTRACT

Techniques for generating text content arranged in a consistent read order from a source document including text corresponding to different read orders are disclosed. A system parses a binary file representing an electronic document to identify characters and metadata associated with the characters. The system pre-sorts a character order of characters in each line of the electronic document to generate an ordered list of characters arranged according to the right-to-left reading order. The system performs a layout-mirroring operation to change a position of characters within the modified document relative to a right edge of the document and a left edge of the document. Subsequent to performing layout-mirroring, the system identifies native left-to-right reading-order text in-line with the native right-to-left reading-order text. The system flips the reading order of the native left-to-right read-order characters into the left-to-right reading order to be consistent with the native right-to-left read-order text.

20 Claims, 6 Drawing Sheets

(51) Int. Cl.
  *G06F 40/30* (2020.01)
  *G06F 40/284* (2020.01)
  *G06F 40/205* (2020.01)

(56) References Cited

U.S. PATENT DOCUMENTS

| | | | | |
|---|---|---|---|---|
| 9,864,750 | B2* | 1/2018 | Tecu | G06F 16/116 |
| 11,714,953 | B2* | 8/2023 | Agrawal | G06F 40/103 |
| | | | | 715/244 |
| 2010/0088674 | A1* | 4/2010 | Della-Libera | G06F 40/205 |
| | | | | 717/114 |
| 2013/0007603 | A1* | 1/2013 | Dougherty | G06T 11/60 |
| | | | | 715/251 |
| 2013/0243324 | A1* | 9/2013 | King | G06V 30/224 |
| | | | | 382/176 |
| 2014/0219562 | A1 | 8/2014 | Khorsheed et al. | |
| 2015/0347355 | A1* | 12/2015 | Kasbar | G09B 17/003 |
| | | | | 715/273 |
| 2016/0132479 | A1* | 5/2016 | Edala | G06F 16/93 |
| | | | | 715/230 |
| 2017/0048069 | A1* | 2/2017 | Baessler | H03M 7/00 |
| 2019/0171872 | A1* | 6/2019 | Northrup | G06V 30/274 |
| 2019/0243878 | A1* | 8/2019 | Kemmel | G06F 40/129 |
| 2020/0302219 | A1* | 9/2020 | Duta | G06F 16/355 |
| 2021/0012102 | A1* | 1/2021 | Cristescu | G06F 40/284 |
| 2021/0240932 | A1* | 8/2021 | Erdemir | G06V 30/413 |
| 2022/0230012 | A1* | 7/2022 | Carrier | G06F 40/30 |

OTHER PUBLICATIONS

"Apache PDFBox Text Extraction", Retrieved from https://pdfbox.apache.org/1.8/cookbook/textextraction.html, Retrieved on Sep. 11, 2022, 4 pages.

"Extract text from PDF in C# and VB.NET", Retrieved from https://bitmiracle.com/blog/extract-text-from-pdf-in-net, Jun. 1, 2020, 7 Pages.

"PdfReadingDirection Enumeration", Retrieved from https://bitmiracle.com/pdf-library/help/pdfreadingdirection.html, Retrieved on Sep. 11, 2022, 2 Pages.

"PDFTextStripper (Apache PDFBox 1.8.10 API)", Retrieved from https://pdfbox.apache.org/docs/1.8.10/javadocs/org/apache/pdfbox/util/PDFTextStripper.html, Retrieved on Sep. 11, 2022, 21 pages.

Al-A'ali et al., "Optical Character Recognition System for Arabic Text Using Cursive Multi-Directional Approach", Journal of Computer Science, vol. 3, Issue 7, Jul. 2007, pp. 549-555.

Khandelwal S., "ArabicOCR—amazing OCR library for Arabic pdf documents", Dec. 21, 2021, 9 Pages.

Kris R., "OCR optimization for RPA—Extract more (data)with Less (cost)", Retrieved from https://www.linkedin.com/pulse/ocr-optimization-rpa-extract-more-data-less-cost-kris-r, Jan. 29, 2021, 12 Pages.

Saudagar et al., "Efficient Arabic Text Extraction and Recognition using Thinning and Dataset Comparison Technique", 2015 International Conference on Communication, Information & Computing Technology (ICCICT), Jan. 2015, 5 Pages.

* cited by examiner

305a

1 [metadata], . [metadata], S [metadata], u [metadata], b, m, i, t, , c, l, a, i, m, s, , o, n, l, i, n, e, , t, h, r, o, u, g, h, t, h, e, w, e, b, s, i, t, e, :, ), z, y, x, ., e, t, i, s, b, e, w, ., w, w, w, (, .

2, ., R, e, i, m, b, u, r, s, e, m, e, n, t, s, w, i, l, l, ,b, e, , p, r, o, c, e, s, s, e, d, , w, i, t, h, i, n, , t, w, o, , t, o, , t, h, r, e, e, ), 3, -, 2, (, w, e, e, k, s, , .

Fig. 3B

305b

“S” [position: 1440, 588], “u” [position: 1433, 588], “b” [position: 1428, 588]...

Fig. 3C

305c

“S” [position: 20, 588], “u” [position: 27, 588], “b” [position: 32, 588]...

Fig. 3D

GENERATING AN ELECTRONIC DOCUMENT WITH A CONSISTENT TEXT ORDERING

INCORPORATION BY REFERENCE; DISCLAIMER

The following application is hereby incorporated by reference: 63/400,008, filed Aug. 22, 2022. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to generating text content with consistent text ordering from a source document including different text reading directions. In particular, the present disclosure relates to generating an ordered list of characters and metadata for a set of text content containing text corresponding to different reading directions. A system presents text content in one order and format for text analysis and a different order and format for presenting the text content.

BACKGROUND

Electronic documents, such as portable document format (PDF) documents, include text in a human-readable format. Applications may search electronic documents in response to queries to identify content within the electronic document. The applications may display portions of the content in response to the queries. Displaying portions of content requires an application to extract content from a document, determine content characteristics, such as language and read-order, and reproduce content consistent with the content characteristics. However, when a line of text in an electronic document includes content in different reading directions, a program extracting the characters of the document may arrange characters in an incorrect reading direction. This may result in confusion in a user reading the text. In addition, if a system uses a machine learning model to analyze text content, the incorrect reading direction may result in an inability of the machine learning model analyzing the text to provide an accurate analysis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3F illustrate an example embodiment; and

DETAILED DESCRIPTION

Figure 1:
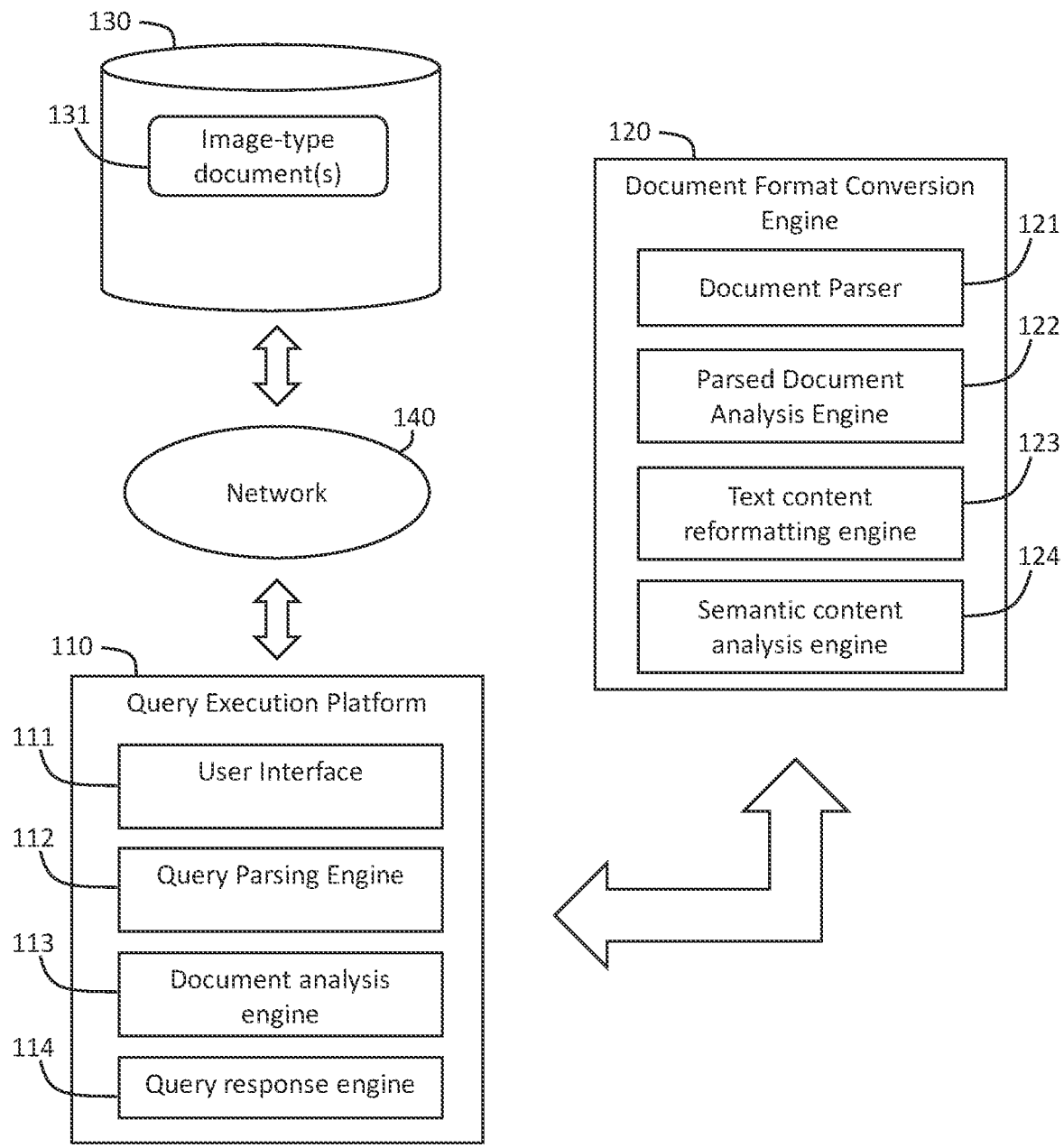
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING TEXT CONTENT WITH A CONSISTENT READING DIRECTION FROM SOURCE TEXT CONTENT WITH VARYING READING DIRECTIONS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

An application, such as a chatbot or a digital assistant, may respond to queries by accessing data from different electronic documents. The application may extract text from an electronic document, analyze the text content, and generate responses. Models that analyze text content require the text to be in certain formats to ensure accurate analysis and response. When content in a document does not comply with the certain formats—such as when a line of text includes two different languages associated with different reading directions—the accuracy of the model in understanding the text and generating a response is degraded.

One or more embodiments generate text content arranged in a consistent reading direction from a source document which includes text corresponding to different reading directions. A system parses a binary file representing an electronic document to identify characters and generate metadata associated with the characters. The metadata may include, for example, language information identifying a language corresponding to the character and position information corresponding to a position of the character in the electronic document. The system pre-sorts a character order of characters in each line of the electronic document. Pre-sorting the character order includes generating a list of characters according to a right-to-left reading direction of the characters. The system then reformats the list of characters to re-order characters associated with a different reading direction from the dominant reading direction for the text. For example, the system may identify Arabic as the primary language for a line of text (e.g., the majority of the characters are Arabic). The system may further determine that Arabic is presented in a right-to-left reading direction and with a right justification. However, the line of text may further include a numeral "400" presented in a left-to-right reading direction. Simply applying a PDF character extraction application may generate a sequence of characters in which the numeral "400" and other nearby text is arranged in an incorrect reading direction and/or order in a sequence of characters. The system identifies content associated with different reading directions in a set of text and modifies the listing of characters in the binary file to arrange the characters, corresponding to different reading directions in the set of text, in a sequential read order.

The system performs a layout-mirroring operation to change a position of characters within the modified document relative to a right edge of the document or the left edge of the document. For example, a word that appears at a right-most edge of an electronic document is aligned with the left-most edge of the document after performing the layout-mirroring operation. The system modifies the position metadata associated with the characters in the list of characters without changing an ordering of the characters in the list.

The system may provide the text content arranged in a consistent reading direction to a machine learning model. The machine learning model may be trained, based on sets of text corresponding to a left-to-right reading direction, to identify semantic content within text passages. For example, a chatbot may use the machine learning model to identify content within Arabic text that is relevant to a query. The system may present content identified by the machine learning model as being relevant to a query in a native display format, corresponding to the original read orders in the electronic document. In other words, the system transforms text content from a native format, including native heterogeneous reading directions of text, into a modified format, including a homogenous read-direction ordering of text, to facilitate machine learning analysis. Based on the machine learning analysis, the system presents relevant text content in its native format, including the native heterogeneous reading directions of text.

One or more embodiments described in this Specification and/or recited in the claims may not be included in this General Overview section.

2. System Architecture

The system 100 generates tagged content based on text formatting metadata of a source electronic document. As illustrated in FIG. 1, system 100 includes a query execution platform 110, a document format conversion engine 120, a data repository 130, and a network 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

A query execution platform 110 receives queries including query terms. For example, a user may generate a query via a user interface 111. According to an example embodiment, the query execution platform 110 is executed on a chatbot or digital assistant. The chatbot or digital assistant may run on an electronic device, such as a personal computer, mobile device, or audio device. The user interface 111 may receive typed query terms in a query field. Additionally, or alternatively, the query execution platform 110 may detect user-generated content and recommend query terms based on user-generated content. In addition, or in the alternative, the query execution platform 110 may detect vocalized query terms and convert the vocalized query terms into digital content. A query parsing engine 112 parses the received query to identify query terms. The query parsing engine 112 may also identify operators, such as logical operators to apply to the query. The query parsing engine 112 may further generate a set of one or more operators for a set of query terms without identifying the operators in the query entered by a user or system. For example, the query parsing engine may generate an "AND" type logical operator for a query including the "flight speed," even if a user did not enter the logical operator.

Based on detecting query terms, the document analysis engine 113 searches one or more data repositories 130 for content matching the query terms. The query execution platform 110 may communicate with the data repositories 130 via a network 140. The network 140 may include a local area network (LAN), cloud-based network, and wide-area network (WAN), such as the Internet. For example, a data repository 130 may include servers connected to the Internet, accessible via web addresses, with content searchable via a search engine. Alternatively, the data repository 130 may be servers maintained by an organization, accessible to devices authorized by the organization, and inaccessible via the Internet.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the query execution platform 110 and the document format conversion engine 120. Alternatively, or additionally, a data repository 130 may be implemented or executed on a computing system separate from the query execution platform 110 and the document format conversion engine 120. A data repository 130 may be communicatively coupled to the query execution platform 110 and the document format conversion engine 120 via a direct connection or via a network.

Information describing image-type documents 131 may be implemented across any of components within the system 100. However, this information is illustrated within the data repository 130 for purposes of clarity and explanation.

According to one embodiment, the document analysis engine 113 searches documents in a same language as the received query. Different languages correspond to different reading directions. For example, English is read from left-to-right. Arabic is read from right-to-left. Japanese may be written and read vertically. Upon receiving a query in a particular language, the document analysis engine 113 may search documents in the same language and reading direction. According to one embodiment, the system may be configured to generate queries in, or convert queries into, a particular language associated with a particular reading direction. For example, if a query is received verbally via an audio sensor, the query execution platform 110 may be configured to generate the query in Arabic, which is associated with a right-to-left reading direction and a right justification. In addition, or in the alternative, if a query is received via the user interface 111 in English-language text, the query execution platform may translate the query into Arabic-language text, including modifying the reading direction and justification.

If the document analysis engine 113 identifies content in an image-type document 131 that is in a specified reading direction, the document analysis engine 113 provides a digital file encoding text content of the document to the document format conversion engine 120. The specified reading direction may be a direction that is determined to be incompatible with language analysis. According to one embodiment, the specified reading direction is a right-to-left reading direction.

The digital file includes metadata specifying each character in the electronic document, location information corresponding to the character, and a formatting style associated with the character. According to one embodiment, the metadata includes a language associated with the character. For example, the metadata may specify that the character is an Arabic-language character or an English-language character. The metadata may specify Unicode values associated with a particular character and language. According to one embodiment, the metadata excludes any Unicode values specifying a reading direction of text. In one or more embodiments, the electronic document is a portable document format (PDF) type document.

A document parser 121 parses a digital file representing the image-type electronic document 136 to identify attributes associated with characters in the document and attributes associated with objects in the document. The document parser 121 generates parsed content, such as a parsed file, including the attribute data for characters and objects in the document. For each character, the document parser 121 generates attribute metadata encoding: (a) bounding box dimensions associated with a character, and (b) a position of the bounding box within the electronic document. The attribute metadata may include additional attributes, such as (b) character font and style data, and (d) character language data (e.g., which language the character belongs to). According to one embodiment, one or both of the bounding box dimensions and the bounding box position are represented as horizontal and vertical coordinates. According to one embodiment, the digital file is a binary-encoded data file.

A parsed document analysis engine 122 analyzes the parsed document generated by the document parser 121 to determine whether the electronic document includes text displayed in different reading directions in the electronic document. For example, the parsed document analysis engine 122 may identify (a) one set of characters in a particular language and read-direction, and (b) one or more alternative sets of characters that are in a different language, include numbers, or include punctuation. The system identifies the alternative sets of characters based on metadata associated with the characters identifying a language of the character and/or a type of character (e.g., punctuation or numerical).

A text content reformatting engine 123 generates a set of reformatted text content suitable for semantic analysis by the semantic content analysis engine 124. The text content reformatting engine 123 generates a character list to normalize the reading direction of characters in a set of text content. If the text is presented in a right-to-left reading direction, the text content reformatting engine 123 lists each character in order, from right to left. If the text is presented in a top-to-bottom reading direction, the text content reformatting engine lists each character in order from top to bottom. In addition to listing each character, the text content reformatting engine 123 stores, together with a respective character, a respective set of position data and formatting data for the character. For example, the system may store a character "1" and metadata encoding (a) dimensions in a coordinate system of a bounding box associated with the character "1", and (b) position information of the bounding box within the electronic document. A next character, in the right-to-left reading direction, may be "0." The system stores the character and corresponding metadata for the character "0."

For a particular line of text arranged in a right-to-left reading order in an electronic document, the text content reformatting engine 123 stores the right-most character first in an ordered list. The text content reformatting engine 123 stores the next right-most character second in the ordered list. The text content reformatting engine 123 stores the third character from the right as the third character in the ordered list, and so on. The text content reformatting engine 123 also lists native left-to-right read-direction characters according to a right-to-left reading direction, opposite to the native reading direction. For example, a number, such as "400," has a native left-to-right reading order and is displayed within an otherwise right-to-left read-direction sentence in the left-to-right reading direction. After the normalizing step, the characters of the number are re-ordered as "0,0,4." Similarly, a URL, such as "http://www.mycompany.xyz", has a native left-to-right reading direction and would be displayed in an otherwise right-to-left read-direction document in its native left-to-right reading direction. After the normalizing step, the URL is stored according to a right-to-left reading direction (i.e., "z, y, x, ., y, n, a, p, m, o, c, y, m, ., w, w, w, \, \, :, p, t, t, h").

The text content reformatting engine 123 performs a mirroring operation to change a layout of the text in the document. The system modifies position information for each character in the ordered list to comply with a particular text justification for a particular semantic content analysis engine 124. According to one embodiment, the semantic content analysis engine 124 is trained on a set of documents with left justified text. Applying data from right-justified text may result in inaccurate predictions by the semantic content analysis engine. Therefore, in this embodiment, the text content reformatting engine 123 modifies the position information for each character in the ordered list to be left justified.

The mirroring operation includes horizontally flipping the position information encoded in the metadata of each character in the document. For example, a character on the right-most position of a page of the electronic document is moved to the left-most position of the page. The position data for the next character in order on the right side of the page is modified to position the character the same distance from the left side of the page. The text content reformatting engine 123 modifies the location information of metadata corresponding to characters without changing the position of the characters in the ordered list of characters. For example, if character "A" is listed before character "B" in the ordered list of characters after the normalizing step, the character "A" remains listed before "B" in the ordered list after mirroring. However, the location information associated with the character "A" places the character on the opposite side of character "B" in a display order.

Subsequent to the mirroring operation, the text content reformatting engine 123 re-orders characters in the ordered list when were presented in a native left-to-right reading direction, instead of the native right-to-left reading direction.

The parsed document analysis engine 122 may identify text content which is in an opposite reading direction from the dominant reading direction. For example, the parsed document analysis engine 122 may identify digits, punctuation, and website domains in a set of text content that is otherwise in a right-to-left reading direction. The text content reformatting engine 123 returns the native left-to-right content into a left-to-right reading order by (a) identifying a grouping of characters associated with a token corresponding to a left-to-right reading order, and (b) reversing, in the character list, the order of the characters of the token. For example, the parsed document analysis engine 122 may identify the URL "http://www.mycompany.xyz" as a token presented in a left-to-right reading direction in a set of text content that is otherwise arranged in a right-to-left reading direction. Upon normalizing the text content, the URL is stored as "z, y, x, ., y, n, a, p, m, o, c, y, m, ., w, w, w, \, \, :, p, t, t, h". The text content reformatting engine 123 re-orders the characters in the ordered list of characters to "h, t, t, p, :, /, /, w, w, w, ., m, y, c, o, m, p, a, n, y, ., x, y, z".

The semantic content analysis engine 124 applies a semantic analysis model to the document content represented by the ordered list of characters. The semantic analysis model is trained to determine a meaning of words, sets of words, numbers, URLs, and other content contained within documents. The semantic analysis model may be trained with datasets in which content is arranged in a left-to-right reading direction and with a left justification. For example, the model may be trained with datasets in which tokens within the content are arranged in a left-to-right order relative to each other and in which characters within the tokens are arranged in a left-to-right reading direction. The semantic analysis model may further be trained with data sets in which the content is left-justified. The semantic content analysis engine 124 identifies content in the electronic document, from which the ordered list of characters was generated, that is relevant to the query terms. The document format conversion engine 120 maps the content, identified as relevant, to the corresponding content in the native electronic document.

The document format conversion engine 120 returns the information identifying the relevant content in the electronic document to the query execution platform 110. The query response engine 114 generates a query response in the native reading order and format. The query response engine 114 provides the query response to the user interface 111 for display. For example, if an electronic document (e.g., image-type document 131) include text in a right-to-left reading order, and right-justified, with intermittent text (such as numbers or webpage addresses) in a left-to-right reading direction, the query response engine 114 generates the query response in the same format (e.g., predominantly right-to-left reading direction, with intermittent left-to-right reading direction content).

Additional embodiments and/or examples relating to computer networks are described below in Section 5, titled "Computer Networks and Cloud Networks."

In one or more embodiments, a query execution platform 110 and/or a document format conversion engine 120 refer to hardware and/or software configured to perform operations described herein for executing queries and converting document formats in response to identifying content matching query terms. Examples of operations for performing document format conversion from image-type content to markup-type content are described below with reference to FIG. 2.

In an embodiment, the query execution platform 110 and the document format conversion engine 120 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 111 refers to hardware and/or software configured to facilitate communications between a user and the query execution platform 110. Interface 111 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 111 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 111 is specified in one or more other languages, such as Java, C, or C++.

Figure 2:
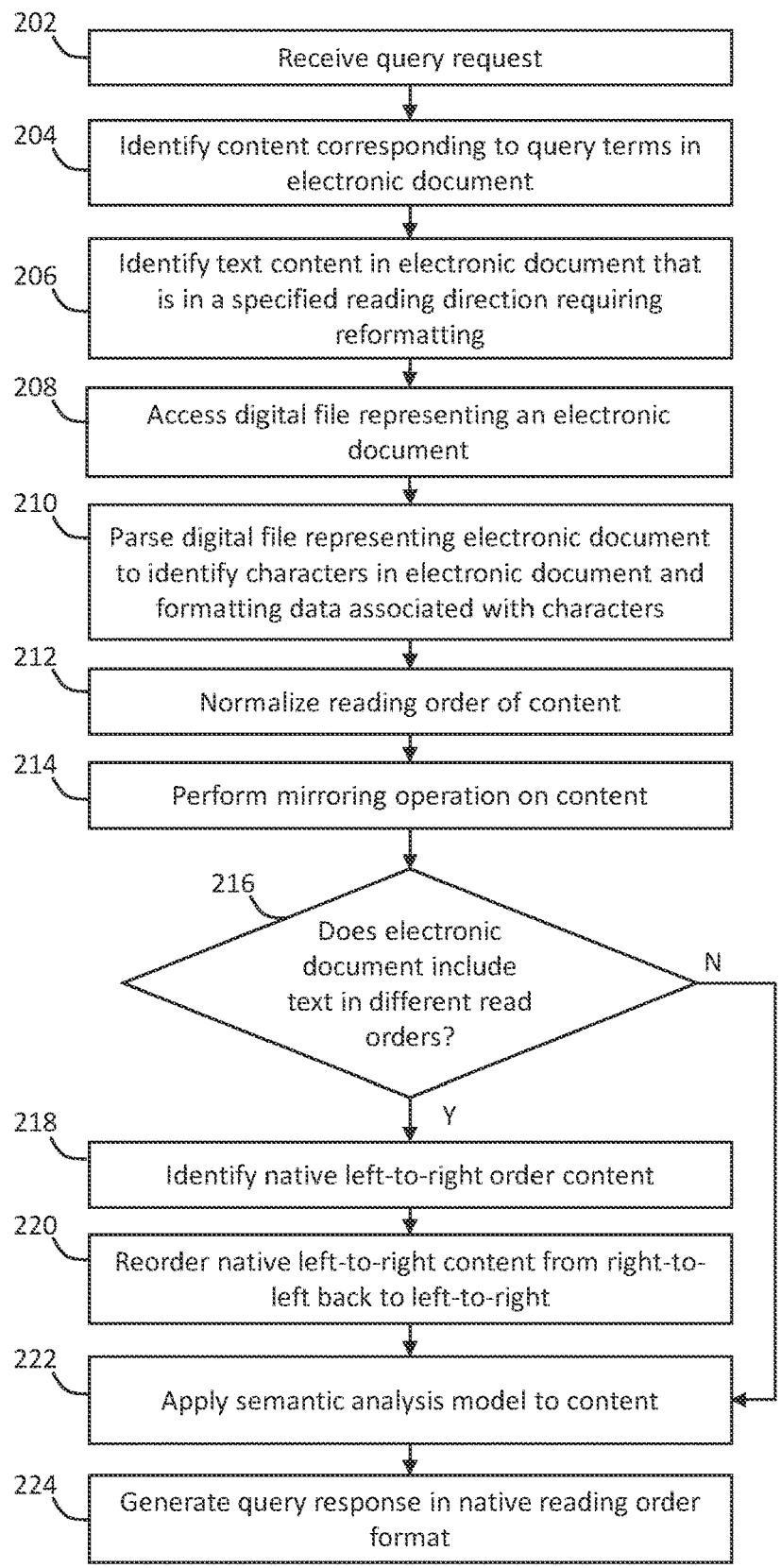
FIG. 2 illustrates an example set of operations for multi-layer forecasting of computational workloads in accordance with one or more embodiments.

3. Generating Text Content with a Consistent Reading Direction from Source Text Content with Varying Reading Directions FIG. 2 illustrates an example set of operations for reordering document content to ensure a consistent reading direction in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a query request (Operation 202). The query request includes query terms to be sought in a set of documents. The set of documents may include a particular set of documents maintained by an organization. Alternatively, the set of documents may include documents accessible to a query platform via a wide area network (WAN) such as the Internet. The system may receive the query request via a chatbot or digital assistant. The system may receive the query request via a user interface, such as via a text interface or a voice interface. The system may automatically, without user intervention, generate the query request in response to identifying a user operation or user typing in another other than a query-generation application.

The system identifies content corresponding to query terms in an electronic document (Operation 204). The system may search a repository of content, including electronic documents, in a same language as the query. In addition, or in the alternative, the system may search a repository of content, including electronic documents, in which at least some content is formatted to be presented in a same reading direction as a reading direction of the query. For example, some languages are read from right-to-left. If the system detects a language formatted to be displayed in a right-to-left reading direction in a query, the system may search documents with content in the same language and reading direction. As a specific example, if the system detects a query generated in the Arabic language (which is presented in a right-to-left reading direction and is typically right-justified), the system may search documents including text in the Arabic language.

The system determines that the text content is in a specified reading direction that required reformatting prior to semantic analysis (Operation 206). For example, a semantics analysis machine learning model may be trained with documents characterized by a left-to-right reading direction and left-justified text. Providing right-to-left reading direction documents and/or right-justified text may result in errors in the semantic analysis. Accordingly, the system determines that the text content includes text in a right-to-left reading direction.

According to one example, the system identifies a language in which a document is displayed. If the document is displayed in a language corresponding to a right-to-left reading direction, the system may determine that the text content requires reformatting prior to semantic analysis. The system may analyze an entire document, a page, or portions within a page to determine the reading direction of text content. For example, one page may include three paragraphs in three different languages. The system may identify content relevant to query terms in only one of the paragraphs. The system may analyze only the paragraph corresponding to the query terms to determine whether the paragraph requires reformatting. If the paragraph is in a right-to-left reading direction, but the other paragraphs are not, the system may determine that only the paragraph in the right-to-left reading direction requires reformatting. Conversely, if the paragraph associated with query terms is in a left-to-right reading direction, but another paragraph on the page is in a right-to-left reading direction, the system may determine that no portion of the document requires reformatting prior to semantic analysis.

A system accesses a digital file representing an electronic document (Operation 208). The digital file includes metadata specifying each character in the electronic document, location information corresponding to the character, and a formatting style associated with the character. According to one embodiment, the metadata includes a language associated with the character. For example, the metadata may specify that the character is an Arabic-language character or an English-language character. The metadata may specify Unicode values associated with a particular character and language. In one or more embodiments, the electronic document is a portable document format (PDF) type document.

The system parses the digital file to identify characters within the electronic document and the metadata associated with the characters (Operation 210). For example, the electronic document may be an image-type document, such as a PDF document or an XPS document. An image-type document parser represents character locations as sets of coordinates. The image-type document parser also represents bounding box boundaries as sets of coordinates. According to one embodiment, the digital file is a binary-encoded data file. According to one embodiment, the electronic document is an image-type document. The electronic document stores metadata specifying each character in the electronic document, location information associated with each character, and location information associated with bounding boxes in the electronic document. The system may generate a set of output data that includes, in a particular order, each character and the metadata associated with each character.

According to one embodiment, the system identifies a reading order of text in a document (Operation 206) subsequent to accessing the digital file (Operation 208). For example, a particular digital file may not include information in metadata associated with characters specifying a reading direction for the character. Instead, the system may identify the reading direction for a set of characters based on position information encoded in the metadata, such as coordinate information for respective characters.

The system generates a digital file including a character list which normalizes the reading direction of the characters (Operation 212). For example, a PDF character extraction application may generate the binary file with native left-to-right characters, which are in-line with native right-to-left characters, in incorrect positions or in an incorrect order. When a line of text includes both left-to-right tokens and right-to-left tokens within the same line, PDF character extraction applications frequently extract text incorrectly. A number which should be extracted as left-to-right text may be extracted as right-to-left text. Conversely, a word that should be extracted as right-to-left text may be extracted as left-to-right text when the word is adjacent to a number that is extracted as left-to-right text. In addition, punctuation, such as parentheses, may be extracted as right-to-left text instead of left-to-right text (e.g., an extraction program may identify a parenthesis as an open parenthesis when it should be a close parenthesis). Normalizing the reading direction includes grouping the characters into text lines using the proximity relationships specified in the metadata of the characters. The system generates an ordered list of characters by reading the character data from the binary file in a right-to-left direction. For example, for a particular line of text, the system stores the right-most character first in an ordered list. The system stores the next right-most character second in the ordered list. The system stores the third character from the right as the third character in the ordered list, and so on. The normalizing step also lists native left-to-right read-direction characters according to a right-to-left reading direction, opposite to the native reading direction. For example, a number, such as "400," has a native left-to-right reading order and is displayed within an otherwise right-to-left read-direction sentence in the left-to-right reading direction. After the normalizing step, the characters of the number are re-ordered as "0,0,4." Similarly, a URL, such as "http://www.mycompany.xyz", has a native left-to-right reading direction and would be displayed in an otherwise right-to-left read-direction document in its native left-to-right reading direction. After the normalizing step, the URL is stored according to a right-to-left reading direction (i.e., "z, y, x, ., y, n, a, p, m, o, c, y, m, ., w, w, w, \, \, :, p, t, t, h").

A token is a set of one or more characters that are on the same row and within a predetermined distance of one another. For example. each word in a row is a separate token. In addition, a number (e.g., "30) is a separate token. Punctuation is a separate token from adjacent alphanumerical tokens. The system may identify tokens within the document using a tokenizer. The tokenizer may analyze each character and metadata associated with the character in the binary file. The tokenizer determines whether the character is a part of a token associated with an adjacent, previously-analyzed character, or if the character is part of a separate token. The tokenizer may consider attributes of the characters to determine whether two adjacent characters belong to the same token. For example, the tokenizer may analyze: a font of the characters, spacing between characters, spacing associated with the font, a formatting style of the characters, a language of the characters, and a character type (e.g., alphanumeric or punctuation) of the characters.

In one or more embodiments, the system identifies a dominant reading order of each line of text. For example, the characters in a document are typically in a reading order associated with the language in which the document is written and stored. In an example in which the document is written mostly in Arabic, the dominant reading order is right-to-left. The document may include left-to-right tokens interspersed among the text of the right-to-left dominant reading order. For example, a paragraph written in Arabic (i.e., right-to-left native reading order) may include a number (e.g., "30") and a URL written in an opposite reading order (i.e., left-to-right). The system normalizes the reading order of the document according to the dominant reading order. After normalization, any tokens that are not in the dominant reading direction may be stored in a reverse reading direction from their native reading direction.

The system performs a mirroring operation to change a layout of the text in the document (Operation 214). The mirroring operation includes horizontally flipping the position information of each character in the document. For example, a character on the right-most position of a page of the electronic document is moved to the left-most position of the page. According to one embodiment, the system modifies the location information of metadata corresponding to characters without changing the position of the characters in the ordered list of characters. For example, if character "A" is listed before character "B" in the ordered list of characters after the normalizing step, the character "A" remains listed before "B" in the ordered list after mirroring. However, the location information associated with the character "A" places the character on the opposite side of character "B" in a display order.

In particular, the ordered list of characters corresponds to an order in which a user would type and read the characters. The location information encoded in the metadata for the characters corresponds to where in the electronic document the characters are displayed. Thus, characters are typed and read in the same order, regardless of whether the characters are displayed in a document as right-justified, left-justified, a right-to-left reading direction, a left-to-right reading direction, or even a vertical reading direction. However, the location information encoded for the characters differs depending upon whether the characters are displayed in the document as right-justified, left-justified, a right-to-left reading direction, a left-to-right reading direction, or a vertical reading direction.

The mirroring operation modifies location information to re-arrange character positions from a right-to-left layout into a left-to-right layout. This enables PDF parsing tools that are designed only to read text displayed in a left-to-right read-direction to work properly on text displayed natively in a right-to-left read-direction. It can also benefit the downstream machine learning model if the downstream machine learning models are only trained on text displayed in a left-to-right reading direction.

According to one embodiment, the system identifies in metadata associated with each character in a line of text the location information associated with each respective character. The system performs mirroring by modifying the location information for each character in the ordered list to be arranged a distance from the left side of the document corresponding to a distance the character was arranged from the right side of the document. This simultaneously modifies both the justification and the reading direction of right-justified text. For example, a character arranged 1,000 pixels from the right side of the document prior to mirroring is arranged 1,000 pixels from the left side of the document after mirroring. Another character arranged 1,020 pixels from the right side of the document prior to mirroring is arranged 1,020 pixels from the left side of the document after mirroring.

The distance of each character from the side of the document may be a distance from an edge of the character. For example, the system may determine that the right-most edge of a character is located 600 pixels from the right side of the document. The system may perform mirroring by arranging the left side of the character 600 pixels from the left side of the document.

The mirroring changes the position of the characters in the document relative to the right side and left side of the document, without changing a facing of the character. For example, the system changes a position of a character corresponding to a right-to-left reading direction within the document without changing the facing of the character to face towards the left side of the document. Instead, the position of the character changes while still facing the right side of the document.

According to one or more alternative embodiments, the system may determine a distance from (a) a corner of a bounding box defining upper, lower, and side boundaries of the character, (b) a center point of the character, or (c) any other point within a region defined by a bounding box associated with the character, and a side of the document. The locations of the characters within the document may be represented as pixel values, coordinate values, or any other location measurement. According to one or more embodiments, in the mirroring operation, the system maintains a vertical position of the character, while modifying the horizontal position of the character.

The system determines, based on the metadata associated with the characters, whether the electronic document includes text displayed in different reading directions in the electronic document (Operation 216). For example, the system may identify (a) one set of characters in a particular language and read-direction, and (b) one or more alternative sets of characters (such as one or more tokens) that are in a different language, include numbers, or include punctuation. The system identifies the alternative sets of characters based on metadata associated with the characters identifying a language of the character and/or a type of character (e.g., punctuation or numerical).

If the system determines the electronic document does not include text displayed in different reading directions (Operation 210, N), the system applies a semantic analysis model to the text content without further reformatting (Operation 222).

If the system determines that the electronic document does include text displayed in different reading directions (Operation 210, Y), the system re-orders native left-to-right content in a right-to-left order (Operation 220). In the normalizing operation, the system reversed the reading order of native left-to-right content into a right-to-left order. The system returns the native left-to-right content into a left-to-right reading order by (a) analyzing Unicode ranges of characters to identify correct reading orders, (b) identifying tokens within the document corresponding to native left-to-right reading orders, and (c) flipping the character order within each token to a left-to-right reading order. For example, the system may identify the URL "http://www.mycompany.xyz" as a token presented in a left-to-right reading direction in a set of text content that is otherwise arranged in a right-to-left reading direction. Upon normalizing the text content, the URL is stored as "z, y, x, ., y, n, a, p, m, o, c, y, m, ., w, w, w, \, \, :, p, t, t, h". The system re-orders the characters in the ordered list of characters to "h, t, t, p, :, /, /, w, w, w, ., m, y, c, o, m, p, a, n, y, ., x, y, z".

The system applies a semantic analysis model to the document content (Operation 222). The semantic analysis model is trained to determine a meaning of words, sets of words, numbers, URLs, and other content contained within a document. The semantic analysis model may be trained with datasets in which content is arranged in a left-to-right order. For example, the model may be trained with datasets in which tokens within the content are arranged in a left-to-right order relative to each other and in which characters within the tokens are arranged in a left-to-right order. The semantic analysis model may further be trained with data sets in which the content is left-justified.

Based on the semantic analysis, the system returns a query response including content matching the query terms (Operation 224). The system returns as a query response (a) content identified based on the text manipulation operations 212-220, and (b) in a native reading direction format corresponding to the reading direction of the original electronic document prior to performing operations 212-218. Accordingly, while the text manipulation operations 212-220 allow a machine learning model, such as a semantic analysis model, to identify content relevant to a query, the system renders the content in its native format. For example, while operations 212-220 facilitate analysis of right-justified Arabic text arranged in a right-to-left reading direction, the system returns a query response in the native Arabic text, including the right justification and right-to-left reading direction.

Generating the query response may include rendering a document, or portion of a document, in its native format. For example, a query response may include an image of a portion of a PDF file. Alternatively, or in addition, generating the query response may include rendering the document, or a portion of the document, in another language. For example, the source document may be an image-type document—such as a PDF document. The query response may be presented in a markup language, such as in an HTML document displayed with a web browser. According to one embodiment, the system renders an excerpt of the electronic document in a markup-type document format, in the native reading direction (e.g., a right-to-left reading direction). The system may generate a web browser tab or window to display content. According to one example, the system generates query responses by rendering HTML content in a display window of a graphical user interface. Rendering the content as HTML content may include assigning a UNICODE value for each character. The UNICODE value may indicate a reading direction of the text. Accordingly, the system may tag, in the ordered list of characters, those characters which are natively arranged in a right-to-left reading direction and those which are natively arranged in a left-to-right reading direction. For example, in a line of text including right-to-left Arabic text and left-to-right website address text, the system tags the characters of the respective text with a respective read-order metadata tag. Upon converting the text to HTML, the system applies a UNICODE value for the characters encoding the respective reading directions for the respective types of text.

According to one embodiment, the parsed binary file of the electronic document includes (a) a list of characters, and (b) for each character, (i) style metadata and (ii) position metadata describing a position of the character within the electronic document. The parsed binary file of the electronic document initially excludes read-direction type metadata information. The system may modify the binary file to generate read-direction-type tags for the characters, based on the position metadata for the characters. Generating the read-direction-type tags for the characters facilitates converting the text into another format (such as converting a PDF-type document into an HTML-type document). The other format (such as HTML) may render text content based on a file including (a) the list of characters, and (b) for each character (or for a string of sequential characters) (i) style tags. The file may exclude position information of characters in a document. For example, re-sizing a window displaying HTML-type text may result in adjusting a format of the text in the window.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 3 illustrates a query received in a query field 301. The query is in Arabic, and is arranged in a right-to-left reading direction.

Based on the query, a query execution engine searches documents in a data repository to identify documents including terms matching the query terms. In the embodiment illustrated in FIG. 3A, the query execution engine identifies text content 302a in an electronic document 302 matching the query terms.

The system determines that the text content is in the right-to-left reading direction requiring reformatting prior to providing the electronic document to a semantic analysis model. Accordingly, the system provides the text content to a text content reformatting engine 304. In particular, the system accesses a digital file representing an electronic document. The digital file includes metadata specifying each character in the electronic document 302, location information corresponding to the characters, and a formatting style associated with the characters. The system parses the digital file to identify characters within the electronic document and the metadata associated with the characters.

Figure 3A:
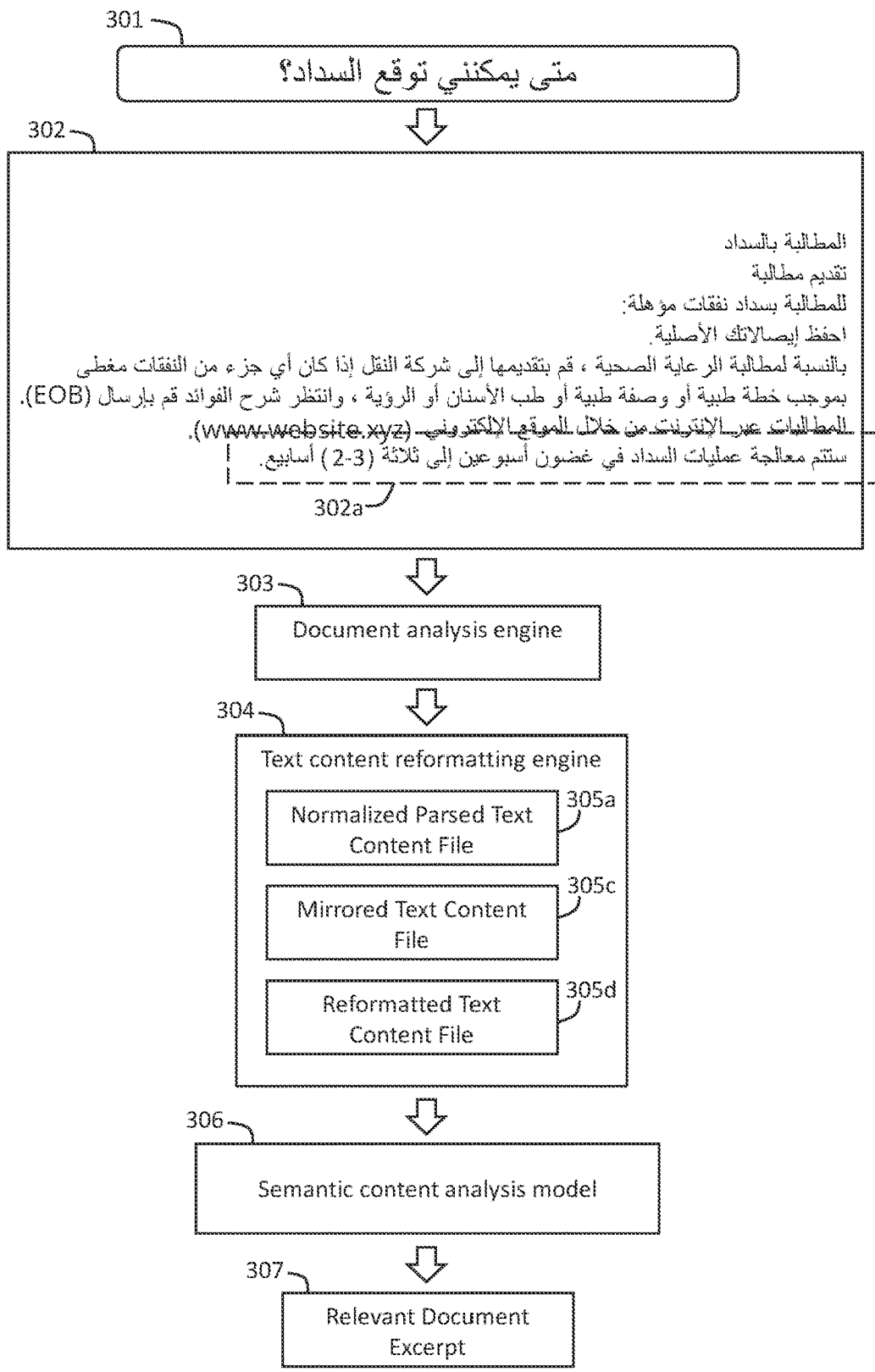

The text content reformatting engine 304 performs a normalizing operation to generate a normalized parsed text content file 305a. An example of an excerpt of the normalized and parsed text content file 305a is illustrated in FIG. 3B. The system generates an ordered list of characters by reading the character data from the digital file in a right-to-left direction. The characters illustrated in FIGS. 3B-3E are illustrated in English for illustration purposes only. In implementation, the system retains the characters in their original language (i.e., Arabic, in FIG. 3A). As illustrated in FIG. 3B, the normalized and parsed text content file 305a includes a list of characters beginning with the character "1" (in Arabic) and the corresponding metadata 311. The list includes, in order, ".", "S", "u", "b", "m", "i", "t", etc., and each characters' respective metadata, including position information of the character in the electronic document 302.

Since the system generates the file 305a by extracting the characters in a right-to-left reading direction, the tokens in the document that were in a left-to-right read direction are extracted in reverse reading order. For example, the characters "w", "w", "w", ".", "w", "e", "b", "s" "i", "t", "e", ".", "x", "y" "z" are extracted in reverse order: "z" "y" "x" ".", "e", "t", "i", "s", "b", "e", "w", ".", "w", "w", "w". In addition, the parentheses ")" and "(" are extracted in a reverse reading direction, such that the parentheses face outward from the parenthetical content.

The text content reformatting engine 304 performs a mirroring operation on the text content to change a layout of the text in the document. The mirroring operation includes horizontally flipping the position information of each character in the document. For example, a character on the right-most position of a page of the electronic document is moved to the left-most position of the page. As illustrated in FIGS. 3C and 3D, a document text content excerpt 305*b* includes a character "S" corresponding to position metadata encoding coordinates: 1440, 588 in the electronic document. After mirroring, as illustrated in FIG. 3D, the character "S" corresponds to position metadata encoding coordinates: 20, 588 in the electronic document. The text content excerpt 305*b* includes a character "u" corresponding to position metadata encoding coordinates: 1433, 588 in the electronic document, indicating a point of the bounding box on the left side of the character is seven pixels from a point on the left side of the adjacent bounding box. After mirroring, as illustrated in FIG. 3D, the character "u" corresponds to position metadata encoding coordinates: 27, 588 in the electronic document. The text content excerpt 305*b* includes a character "b" corresponding to position metadata encoding coordinates: 1428, 588 in the electronic document, indicating a point of the bounding box on the left side of the character is five pixels from a point on the left side of the adjacent bounding box. After mirroring, as illustrated in FIG. 3D, the character "b" corresponds to position metadata encoding coordinates: 32, 588 in the electronic document. While FIG. 3D illustrates an excerpt of the text mirrored text content file 305*c*, the mirrored text content file 305*c* may include mirrored text from the entire electronic document 302.

Figure 3E:
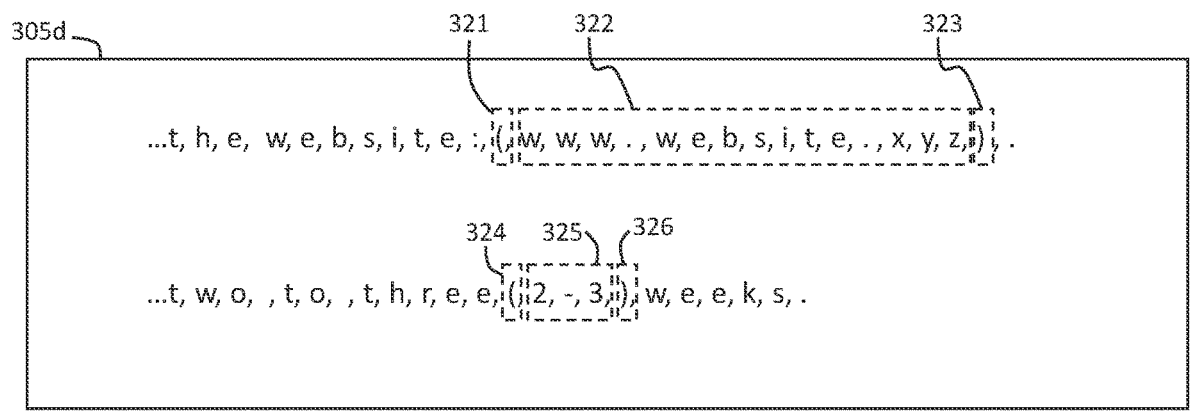
Figure 3F:
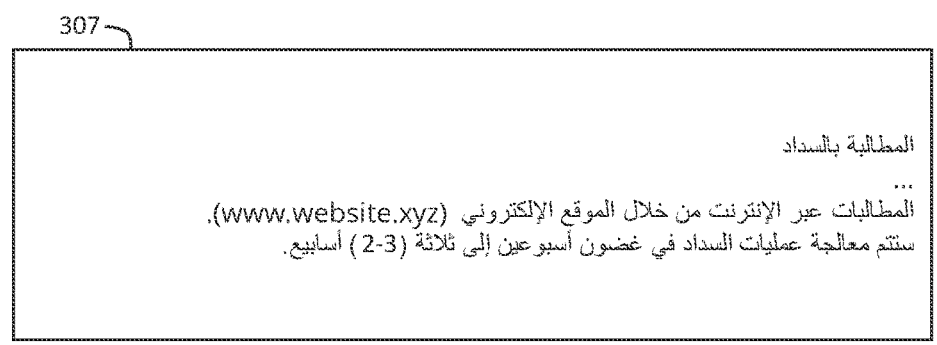

The text content reformatting engine 304 re-orders content natively displayed as left-to-right content among the right-to-left content to generate a reformatted text content file 305*d*. As illustrated in FIG. 3E, the text content reformatting engine 304 identifies parentheses 321, 323, 324, and 326, a website address 322, and number content 325 to be re-ordered in the reformatted text content file 305*d*.

The system provides the reformatted text content file 305*d* to a semantic content analysis model 306. The semantic analysis model is trained to determine a meaning of words, sets of words, numbers, URLs, and other content contained within a document. The semantic analysis model is trained with datasets in which content is arranged in a left-to-right order and is left-justified. The semantic content analysis model 306 identifies content, represented in the excerpt 307, that is related to the query terms. The system presents the excerpt 307 in response to the query. The system presents the excerpt 307 in the format in which the text content appears in the electronic document 302. In the example illustrated in FIG. 3F, the system displays Arabic text in a right-to-left reading direction and in a right-justified format. In addition, the system displays native left-to-right reading order content, such as the website address and numerical content, as they are displayed in the electronic document 302 (i.e., in a left-to-right reading direction, and right justified). Accordingly, from a user's perspective, the user enters a query in a right-to-left reading direction language and obtains a query response in the same right-to-left reading direction language. However, between receiving the query and presenting the response, the system reformats candidate query response content to be compatible with the semantic content machine learning model trained to identify relevant content in documents.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
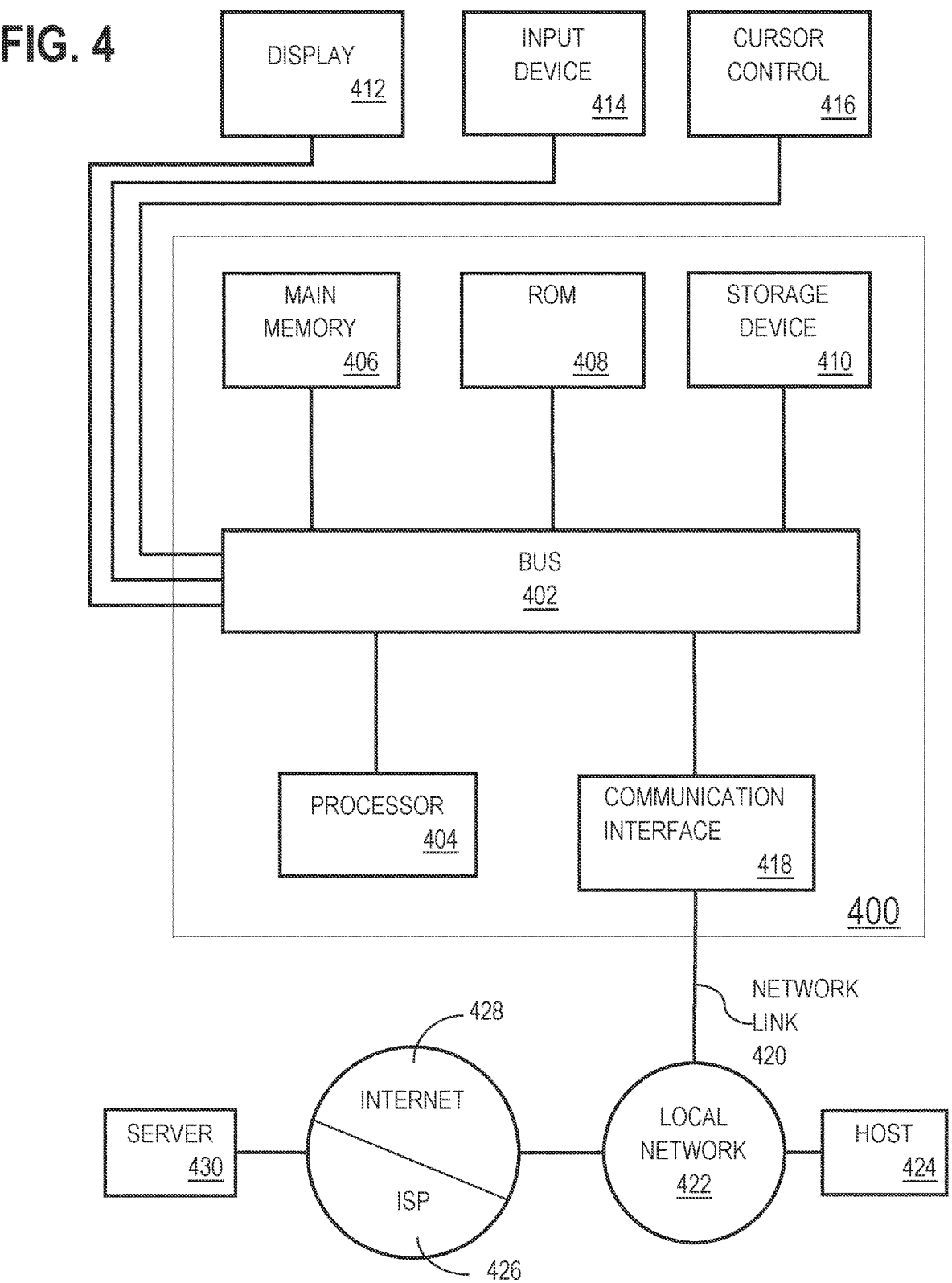
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
   accessing a first digital file comprising text content of an electronic document, the first digital file comprising a first set of one or more tokens arranged in a left-to-right reading direction and a second set of tokens arranged in a right-to-left reading direction;
   executing a first operation to generate a second digital file in which all characters are arranged in the left-to-right reading direction at least by:
      generating an ordered list of characters by extracting a plurality of characters from the first digital file in the right-to-left reading direction and storing each character of the plurality of characters, and metadata corresponding to each respective character;
      mirroring a layout of the electronic document by modifying the metadata associated with each character among the plurality of characters in the ordered list to flip a horizontal position of each character in the electronic document relative to a right side of the electronic document and a left side of the electronic document;
      identifying one or more first tokens associated with a native left-to-right read order in the electronic document; and
      reordering characters in the one or more first tokens from the right-to-left reading order to the left-to-right reading order,
   wherein the mirroring the layout of the electronic document further comprises:
      for each character among the plurality of characters:
         identifying a particular distance of a particular character relative to a right side boundary of the electronic document; and
         modifying the metadata of the particular character to reposition the particular character within the electronic document the particular distance from a left side boundary of the electronic document.

2. The one or more non-transitory computer readable media of claim 1, wherein
   the first set of one or more tokens corresponds to a first language, and
   wherein the second set of tokens corresponds to a second language.

3. The one or more non-transitory computer readable media of claim 2, wherein the second language is Arabic.

4. The one or more non-transitory computer readable media of claim 1, wherein
   the metadata includes a coordinate position for a respective character, and
   wherein modifying the metadata associated with each character among the plurality of characters in the ordered list comprising modifying a horizontal coordinate value for the respective character without modifying a position of the respective character in the second digital file.

5. The one or more non-transitory computer readable media of claim 1, wherein the operations further comprise:
   providing a semantic content analysis machine learning model with a first set of input data corresponding to the content of the second digital file, and
   generating, by the semantic content analysis machine learning model, a first set of predictions identifying a particular set of content in the electronic document as being relevant to a particular set of query terms,
   wherein the semantic content analysis machine learning model is trained to generate a second set of predictions based on receiving as input data a second set of input data corresponding to the content of the first digital file.

6. The one or more non-transitory computer readable media of claim 5, wherein the operations further comprise:
   presenting as a query response the particular set of content in the electronic document including the first set of one or more tokens arranged in the left-to-right reading direction and the second set of tokens arranged in the right-to-left reading direction.

7. The one or more non-transitory computer readable media of claim 1, wherein the operations further comprise:
   receiving a query specifying a set of query terms;
   responsive to receiving the query, identifying the electronic document containing content matching the set of query terms;

wherein accessing the first digital file and executing the first operation to generate the second digital file are performed responsive to identifying the electronic document, and wherein the operations further comprise:

generating a response to the query including the content in the electronic document matching the set of query terms and additional content identified based on providing the second digital file as input data to a semantic content analysis machine learning model.

8. A method comprising:

accessing a first digital file comprising text content of an electronic document, the first digital file comprising a first set of one or more tokens arranged in a left-to-right reading direction and a second set of tokens arranged in a right-to-left reading direction;

executing a first operation to generate a second digital file in which all characters are arranged in the left-to-right reading direction at least by:

generating an ordered list of characters by extracting a plurality of characters from the first digital file in the right-to-left reading direction and storing each character of the plurality of characters, and metadata corresponding to each respective character;

mirroring a layout of the electronic document by modifying the metadata associated with each character among the plurality of characters in the ordered list to flip a horizontal position of each character in the electronic document relative to a right side of the electronic document and a left side of the electronic document;

identifying one or more first tokens associated with a native left-to-right read order in the electronic document; and reordering characters in the one or more first tokens from the right-to-left reading order to the left-to-right reading order, wherein the mirroring the layout of the electronic document further comprises:

for each character among the plurality of characters:

identifying a particular distance of a particular character relative to a right side boundary of the electronic document; and modifying the metadata of the particular character to reposition the particular character within the electronic document the particular distance from a left side boundary of the electronic document.

9. The method of claim 8, wherein the first set of one or more tokens corresponds to a first language, and wherein the second set of tokens corresponds to a second language.

10. The method of claim 9, wherein the second language is Arabic.

11. The method of claim 8, wherein the metadata includes a coordinate position for a respective character, and wherein modifying the metadata associated with each character among the plurality of characters in the ordered list comprising modifying a horizontal coordinate value for the respective character without modifying a position of the respective character in the second digital file.

12. The method of claim 8, further comprising:

providing a semantic content analysis machine learning model with a first set of input data corresponding to the content of the second digital file, and generating, by the semantic content analysis machine learning model, a first set of predictions identifying a particular set of content in the electronic document as being relevant to a particular set of query terms, wherein the semantic content analysis machine learning model is trained to generate a second set of predictions based on receiving as input data a second set of input data corresponding to the content of the first digital file.

13. The method of claim 12, further comprising:

presenting as a query response the particular set of content in the electronic document including the first set of one or more tokens arranged in the left-to-right reading direction and the second set of tokens arranged in the right-to-left reading direction.

14. The method of claim 8, further comprising:

receiving a query specifying a set of query terms;

responsive to receiving the query, identifying the electronic document containing content matching the set of query terms;

wherein accessing the first digital file and executing the first operation to generate the second digital file are performed responsive to identifying the electronic document, and wherein the method further comprises:

generating a response to the query including the content in the electronic document matching the set of query terms and additional content identified based on providing the second digital file as input data to a semantic content analysis machine learning model.

15. A system comprising:

one or more processors; and memory storing instructions that, when executed by the one or more processors, cause the system to perform operations comprising:

accessing a first digital file comprising text content of an electronic document, the first digital file comprising a first set of one or more tokens arranged in a left-to-right reading direction and a second set of tokens arranged in a right-to-left reading direction;

executing a first operation to generate a second digital file in which all characters are arranged in the left-to-right reading direction at least by:

generating an ordered list of characters by extracting a plurality of characters from the first digital file in the right-to-left reading direction and storing each character of the plurality of characters, and metadata corresponding to each respective character;

mirroring a layout of the electronic document by modifying the metadata associated with each character among the plurality of characters in the ordered list to flip a horizontal position of each character in the electronic document relative to a right side of the electronic document and a left side of the electronic document;

identifying one or more first tokens associated with a native left-to-right read order in the electronic document; and reordering characters in the one or more first tokens from the right-to-left reading order to the left-to-right reading order, wherein the mirroring the layout of the electronic document further comprises:

for each character among the plurality of characters:

identifying a particular distance of a particular character relative to a right side boundary of the electronic document; and modifying the metadata of the particular character to reposition the particular character within the electronic document the particular distance from a left side boundary of the electronic document.

16. The system of claim 15, wherein the first set of one or more tokens corresponds to a first language, and wherein the second set of tokens corresponds to a second language.

17. The system of claim 16, wherein the second language is Arabic.

18. The system of claim 15, wherein the metadata includes a coordinate position for a respective character, and wherein modifying the metadata associated with each character among the plurality of characters in the ordered list comprising modifying a horizontal coordinate value for the respective character without modifying a position of the respective character in the second digital file.

19. The system of claim 15, wherein the operations further comprise:

providing a semantic content analysis machine learning model with a first set of input data corresponding to the content of the second digital file, and generating, by the semantic content analysis machine learning model, a first set of predictions identifying a particular set of content in the electronic document as being relevant to a particular set of query terms, wherein the semantic content analysis machine learning model is trained to generate a second set of predictions based on receiving as input data a second set of input data corresponding to the content of the first digital file.

20. The system of claim 19, wherein the operations further comprise:

presenting as a query response the particular set of content in the electronic document including the first set of one or more tokens arranged in the left-to-right reading direction and the second set of tokens arranged in the right-to-left reading direction.

* * * * *